June 6, 1944.  C. B. RICHEY  2,350,476
LIME SPREADER
Filed July 13, 1943   2 Sheets-Sheet 1
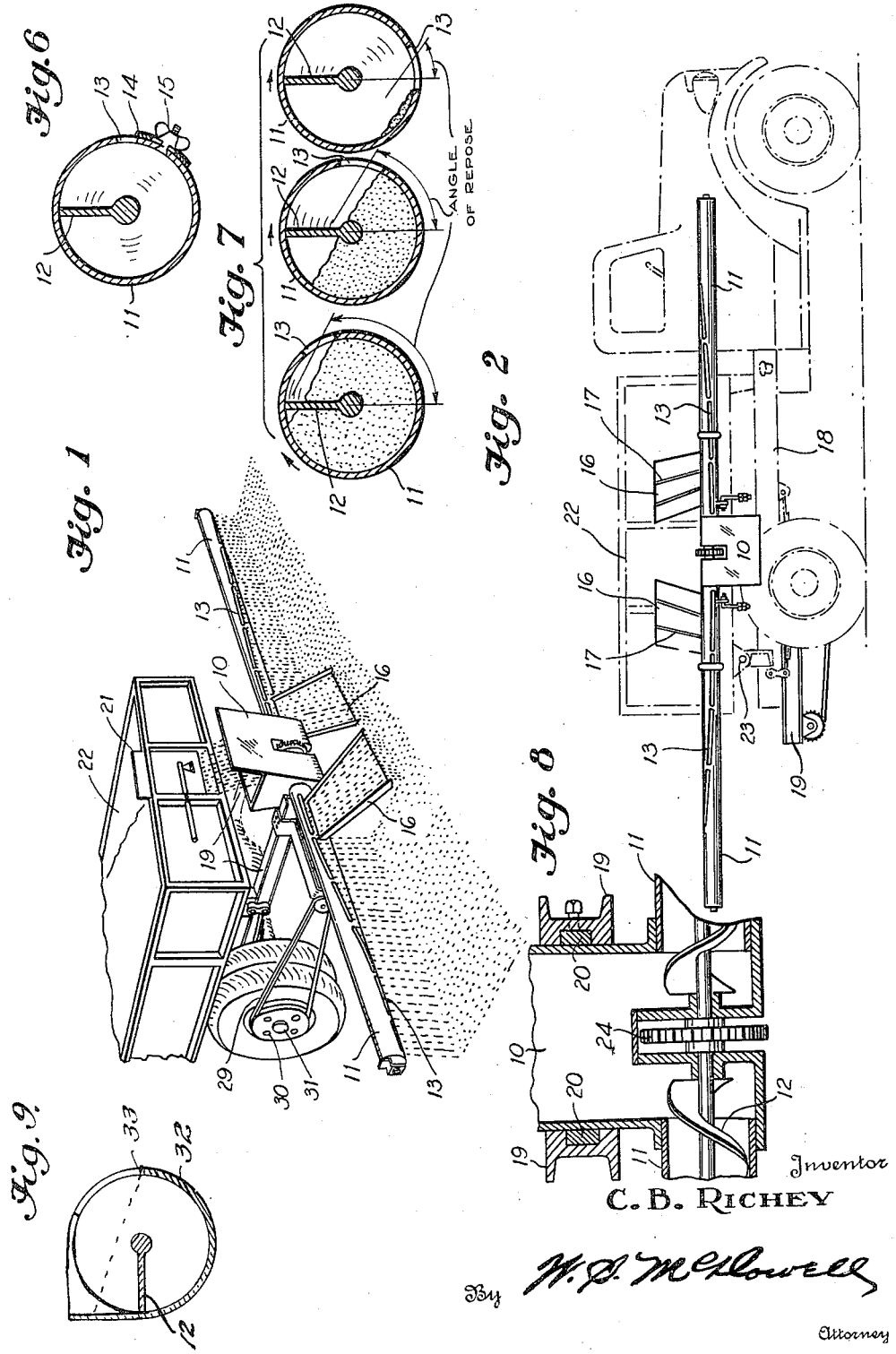
Inventor
C. B. RICHEY
By W. S. McDowell
Attorney June 6, 1944. C. B. RICHEY 2,350,476
LIME SPREADER
Filed July 13, 1943 2 Sheets-Sheet 2

Inventor
C. B. RICHEY
By H. B. McDowell
Attorney

Patented June 6, 1944

2,350,476

UNITED STATES PATENT OFFICE 2,350,476

LIME SPREADER

Clarence B. Richey, Columbus, Ohio

Application July 13, 1943, Serial No. 494,481

5 Claims. (Cl. 275—2)

The object of this invention is to provide improved apparatus for spreading loose solid materials in a uniformly distributed manner over base areas adapted for the reception of such materials, as in the spreading of lime to neutralize soil acidity, or of sand, calcium chloride, fertilizer or the like on road, field and other surfaces.

While the spreading apparatus forming the present invention may be employed to disperse many kinds of substantially dry granular or finely divided materials, one of its primary uses is to spread liming materials over farm soil. Since the fundamental purpose of liming is to sweeten the soil for the growth of a satisfactory legume crop, it follows that there should be an even distribution of the lime particles over the field in order that a maximum number of the legume seedlings will find sweetened areas for their best growth and development.

Some of the variables which militate against such distribution are as follows:

(a) Variation of the rate at which the liming material is fed to the spreading mechanism;

(b) The variation and the thickness of spread of said materials throughout the width of the ground strip over which the spreading mechanism operates;

(c) Variation in the proportion of large and small lime particles throughout the width of the strip covered.

Variations in thickness of lime spreading over the field are undesirable because there will be too little liming material in some spots and more than necessary in others. It has been found that during the first year each lime particle tends to sweeten the soil which is within a distance of ⅛" to ¼" from it. In an acid soil, only the legume seeds falling on these sweetened areas will grow satisfactorily. With a light spread there will be fewer sweet areas and a thinner stand.

Segregation of large and small particles, even if the weight per square foot were even, is important from two standpoints. First, there will be fewer particles and therefore fewer sweet areas. Second, coarse particles do not have as much sweetening effect for their weight as small particles. The rate at which a pound of limestone dissolves is very nearly proportional to the surface area of the particles, because it is the contact of water with the surface of the particles which causes the material to dissolve. The opening in a 14-mesh screen is eight times the width of that in a 100-mesh screen and material of the latter size has eight times the surface area of an equal weight of the other. From this, it can be seen that prevention in the segregation of large and small particles is just as important as rate and uniformity of spreading.

Inherently, lime spreaders of the prior art do not provide in their mechanical functioning these desirable features of uniformitly in the distribution of lime over field surfaces. Many of the modern lime spreaders involve one or more power driven disks to the central regions of which the liming material is fed from a hopper, the rotation of the disks causing the material to be flung tangentially from their peripheral edges. In such spreaders, the mechanism is mounted on the rear of a truck or other vehicle, the liming materials being fed from the body of the truck or vehicle into the hopper of the spreader, this being done in some cases by automatic means or manually. Such disk spreaders do not provide for the uniform distribution of the liming materials over the soil strips traversed thereby, nor for uniform release of large and small lime particles. Other types of standard lime spreaders involve the employment of wide hoppers, having outlet slots in the bottom thereof through which the material is fed straight downwardly upon the soil. Usually, movable agitators are provided in these hoppers in an effort to maintain an even flow of the liming materials through the outlet slots. Such spreaders cover but a narrow strip of ground and are slow in use as compared with the above mentioned disk types; also, considerable variation in lime distribution takes place with their employment. Spreaders of the rotary beater type are also used to some extent, the latter operating to produce a lime dust which settles on the soil.

It is a primary object of the present invention to provide a lime spreader in which the disadvantages and limitations present in prior art devices are largely overcome or minimized, a spreader being provided which is rapid in its operation, capable of covering a wide ground strip in a single passage thereover, and one in which the liming materials are uniformly distributed throughout the full width of the ground strip, both from a standpoint of quantity and in particle size.

Accordingly, the present invention comprehends an improved spreader adapted to be detachably mounted on the frame of a motor truck or other vehicle having a vertically tiltable dump body, so that lime or other material discharged from the tail gate of said body may be delivered at a controlled rate to the centrally positioned hopper of the spreader, the material so delivered being advanced from the hopper through a pair of longitudinally aligned conduits which extend transversely of the rear end of the vehicle at an appropriate distance above the ground, the material being fed through said conduits by means of power driven screw-type conveyors, the said conduits, in turn, being each provided with a helical slot-like outlet for said material, the pitch of each outlet being such that at the inner material-receiving end of the conduit the outlet occupies its highest position, and at the outer end of the conduit its lowest position, the arrangement being such that a uniform quantity of the liming material is discharged from the outlet throughout the length of the conduit.

A further object of the invention is to provide means for quickly and removably mounting the spreader mechanism on the rear end of a motor propelled dump body truck, so that when the spreader is not in use and is being transported from place to place, the same may be mounted on the side of the truck vehicle in such manner that the conduits will extend longitudinally of the vehicle, adapting the latter to normal highway travel and yet permitting conduits of desired length to be used in active field operation of the spreader.

For a further understanding of the invention, reference is to be had to the following description and the accompanying drawings, wherein:

Fig. 1 is a perspective view disclosing my improved lime spreader in its operative position on the rear end of a dump body motor truck;

Fig. 2 is a side elevational view disclosing the lime spreader when inoperatively positioned on the side of a motor vehicle for high speed transportation;

Fig. 6 is a detail vertical sectional view showing a modified form of the spreader;

Fig. 7 is a group view, showing the conduit of my improved lime spreader in vertical transverse cross section; first, at its material-receiving end, second, at a midway point in its length, and, third, at its outer end;

Fig. 8 is a vertical transverse sectional view on the line VIII—VIII of Fig. 3;

Fig. 9 is a vertical transverse sectional view taken through a modified form of conduit.

Figure 3:
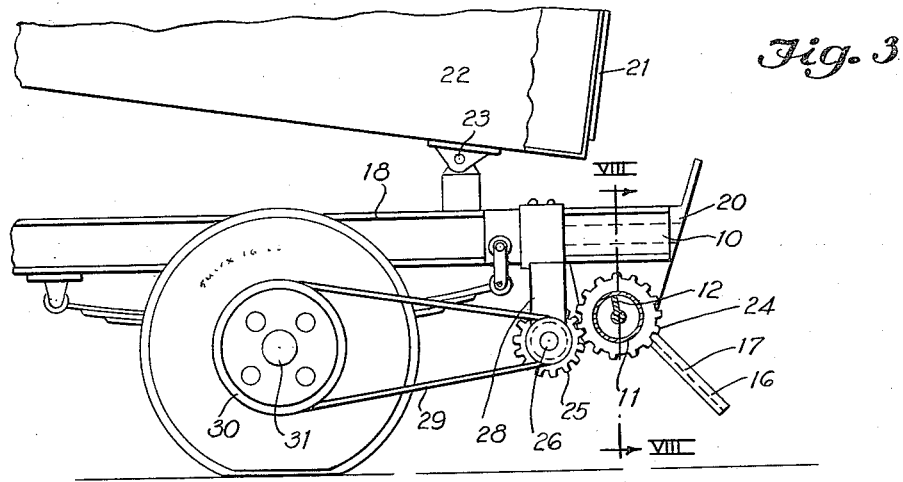
Fig. 3 is a vertical transverse sectional view showing my improved spreader when actively positioned on a motor truck, the plane of the figure being indicated by the line III—III of Fig. 4.
Figure 4:
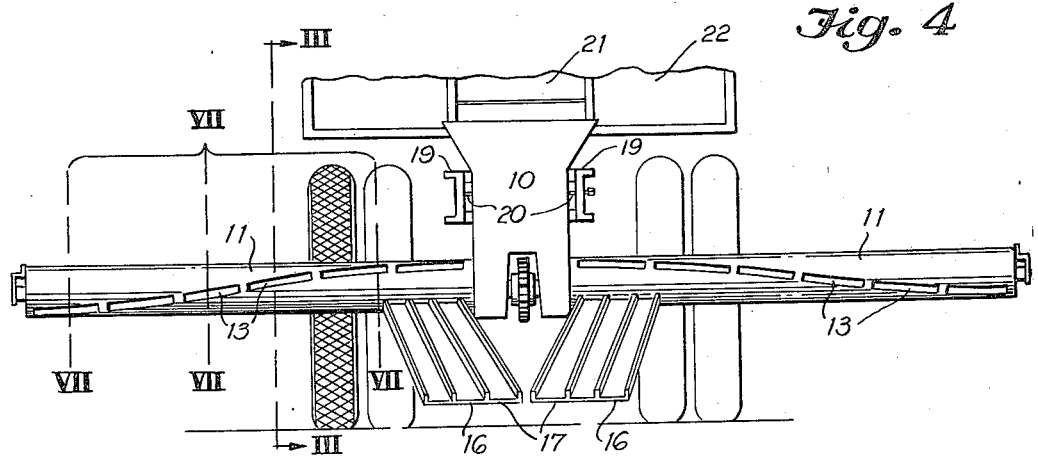
Fig. 4 is a rear elevational view of a motor truck provided with my improved lime spreader.
Figure 5:
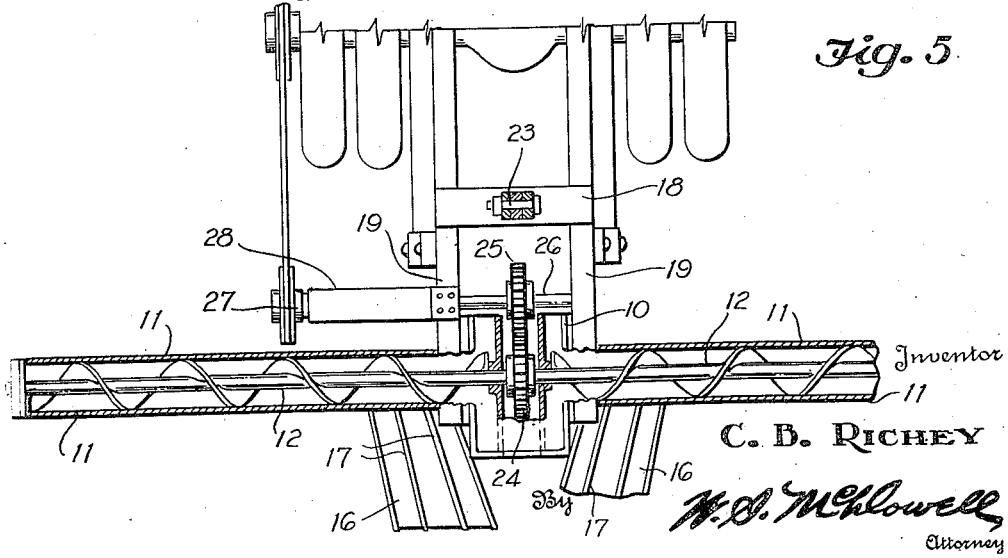
Fig. 5 is a plan view, partly in horizontal section, of the lime spreader.

Referring more particularly to the drawings, my improved lime spreader comprises a centrally located hopper 10, from the bottom of which extends in opposite directions a pair of longitudinally aligned horizontally disposed conduits 11. Arranged within these conduits is a rotatable, spirally bladed conveyor 12, through the rotation of which lime, or other similar free flowing materials, are advanced from the hopper lengthwise of said conduit. In order that such materials may be discharged uniformly from the conduits throughout their lengths, each of said conduits is formed with a helical slot-like outlet 13, the pitch of said outlet being such that at the inner material receiving end of the conduit the outlet occupies its highest position and at the outer end of the conduit, its lowest position.

For constructional reasons, the outlet of each conduit comprises a series of helically arranged slots, as shown in Figs. 1 and 2 so that the conduit, which is advantageously formed from sheet metal, may possess the desired mechanical strength and structural stability. The lime entering the material receiving end of each conduit substantially completely fills the transverse cross sectional area at that point of the conduit. As the material is advanced lengthwise of the conduit toward its closed outer end, said material diminishes in height, and the speed of rotation of the conveyor 12 and the position of the outlet or outlets 13 are correlated so that the angle of repose of the material within the conduit at each point throughout its length will be such as to enable the material to flow gravitationally and cascade over the lower edge of the outlet slots in a uniform stream.

If desired, and as shown in Fig. 6, the lower edge of each slot may be rendered adjustable by the provision of arcuate weir elements 14. These elements are individually adjustable through the action of threaded clamping devices 15 so that each outlet or slot may be regulated to effect a controlled rate of lime discharge therefrom. Contiguous to the hopper 10, the conduits are formed with inclined aprons 16. These aprons are arranged to project over the path of travel of the hopper so that the lime may be spread on the soil over which the hopper passes. The aprons may be provided with angular guides 17 to direct lime flow to the desired areas.

The most desirable embodiment of my invention consists in constructing the same as an attachment for dump body motor trucks. This may be done conveniently by providing the frame 18 of such a truck with spaced parallel extensions 19. These extensions may be formed along their inner faces with guides in which are slidably received parallel bars 20 secured to the vertical sides of the hopper 10. When the hopper is positioned in and held by these guides, the open upper end of the hopper will be disposed immediately beneath the adjustable tail gate 21 of the vertically swinging truck body 22. This body swings, as usual, about a horizontal pivot 23, any conventional mechanism, not shown, being provided on the truck for raising and lowering the body. To rotate the screw conveyors 12, the shaft of the latter conveniently is provided with a gear 24 which, when the hopper is operatively positioned in the frame extensions 19, engages with a complemental gear 25 provided on a countershaft 26 journaled in bearings 27 formed in the frame extensions 19 and a bracket shown at 28. The outer end of the shaft 26 is provided with a sprocket over which passes an endless chain 29, the latter being also trained over a sprocket or other drive wheel 30 carried by the drive axle assembly 31 of the truck. Any other suitable drive mechanism may be utilized for that herein specifically illustrated and described.

In view of the foregoing, it will be evident that the present invention provides a lime spreader, or other distributor for relatively dry free-flowing solids, by which the above stated objects of the present invention are achieved. An essential feature consists in forming the conduits 11, as illustrated in Fig. 7, so that the helical outlets 13 will be so located in the length of each conduit that the lime or other material does not assume completely a state of static equilibrium in any part of the full length of the conduit. By locating the lower edges of the outlets just below the upper portions of the material, the latter is thereby gravitationally discharged through the helical outlet in a continuous uniform quantity throughout the length of the conduit. Not only is the quantity uniform but, also, the particle sizes are likewise uniform. Furthermore, the rate of delivery of the material is kept constant by the action of the auger conveyors 12 as long as the liming materials are delivered in appropriate quantities to the hopper 10. The apparatus, as shown in Fig. 1, may be readily mounted on the end of a motor truck to extend transversely with respect thereto, and the conduits are of such length as to cover a wide swath of ground so that the operation of liming a given field may be accomplished expeditiously. Through the action of the auger conveyor, the truck may be advanced over a field at speeds of from 4 to 7 miles per hour or higher. When the spreader is not in use, the same may be secured longitudinally to the side of the motor vehicle, as illustrated in Fig. 2, and the apparatus thus adapted for highway transportation.

It will be understood that my spreader is subject to certain structural variations or mechanical modifications without departing from its essential features. For example, in Fig. 9, the distributing conduit 32 is substantially U or trough shaped in transverse cross section. However, the weir edge 33 of this conduit has substantially the helical lead of the lower edges of the more restricted outlets 13 employing the preferred form of the invention. The trough or conduit 32 may be open along its top substantially throughout its length, except at its inner end where it is joined with the hopper. Also, in lieu of using the auger-type conveyors shown at 12, any other suitable means may be employed for advancing the materials in a positive manner longitudinally by the distributing conduits.

I claim:

1. In a spreader mechanism for distributing free-flowing solid materials, means for introducing such materials into one end of said conduit, power driven means disposed within said conduit for effecting positive advancement of the materials longitudinally thereof, and a substantially helical outlet for said materials formed in and substantially coextensive with said conduit, the pitch of said outlet being such that at the inner material-receiving end of the conduit, the outlet occupies its highest position and at the other end of the conduit its lowest position.

2. In a spreader mechanism for distributing free-flowing solid materials, means for introducing such materials into one end of said conduit, power driven means disposed within said conduit for effecting positive advancement of the materials longitudinally thereof, a substantially helical outlet for said materials formed in and substantially coextensive with said conduit, the pitch of said outlet being such that at the inner material-receiving end of the conduit, the outlet occupies its highest position and at the other end of the conduit its lowest position, and adjustable means carried by said conduit for raising and lowering the effective lower edge of said outlet.

3. In a spreader mechanism for free-flowing solid materials, an elongated conduit of restricted cross sectional area, positively operated means for advancing said materials longitudinally of said conduit from one end thereof to the other with the height of the materials progressively diminishing from the material-receiving end of the conduit to its outer end, and a helical outlet for said materials formed in said conduit, the pitch of said outlet being such at any given point in the length of the conduit that its lower edge will be located immediately below the angle of repose of the top of the materials within the conduit, whereby to provide for a controlled gravitational flow of said material through said outlet.

4. In a spreader mechanism for free-flowing solid materials, a centrally disposed hopper, longitudinally aligned conduits projecting from said hopper in opposite directions, said conduits having their inner ends in open communication with the interior of said hopper, rotatable helically bladed conveyors positioned in said conduits, means adapted to be actuated by an associated motor vehicle for effecting the rotation of said conveyors, and a helical slot-like outlet for said materials formed in each of said conduits, the pitch of each of said outlets being such that at the inner material-receiving end of the conduit, the outlet occupies its highest position and at the other end of each conduit, the outlet occupies its lowest position.

5. In a spreader mechanism for free-flowing solid materials, a centrally disposed hopper, longitudinally aligned conduits projecting from said hopper in opposite directions, said conduits having their inner ends in open communication with the interior of said hopper, rotatable helically bladed conveyors positioned in said conduits, means adapted to be actuated by an associated motor vehicle for effecting the rotation of said conveyors, a helical slot-like outlet for said materials formed in each of said conduits, the pitch of each of said outlets being such that at the inner material-receiving end of the conduit, the outlet occupies its highest position and at the outer end of each conduit, the outlet occupies its lowest position, and means for detachably connecting said hopper to the frame structure of an associated motor vehicle.

CLARENCE B. RICHEY.